US00RE45088E

(19) United States
(12) Reissued Patent
Kai

(10) Patent Number: US RE45,088 E
(45) Date of Reissued Patent: Aug. 19, 2014

(54) SYSTEM FOR SEARCHING TV PROGRAM DATA VIA THE INTERNET

(75) Inventor: Naoto Kai, Toyko (JP)

(73) Assignee: Naoto Kai, Tokyo (JP)

(21) Appl. No.: 12/781,287

(22) Filed: May 17, 2010

Related U.S. Patent Documents

Reissue of:
(64) Patent No.: 6,993,783
Issued: Jan. 31, 2006
Appl. No.: 09/860,631
Filed: May 21, 2001

U.S. Applications:
(63) Continuation of application No. 12/021,713, filed on Jan. 29, 2008, now abandoned, which is an application for the reissue of Pat. No. 6,993,783.

(30) Foreign Application Priority Data

Sep. 7, 2000 (JP) ..... 2000-272159

(51) Int. Cl.
*H04N 5/445* (2011.01)
*H04N 7/173* (2011.01)

(52) U.S. Cl.
USPC ..... 725/53; 725/110; 725/116

(58) Field of Classification Search
USPC ..... 725/53, 109, 110, 116
See application file for complete search history.

(56) References Cited

U.S. PATENT DOCUMENTS

| | | | | |
|---|---|---|---|---|
| 4,688,189 | A | 8/1987 | Hirata | |
| 5,801,747 | A * | 9/1998 | Bedard | 725/46 |
| 5,956,716 | A * | 9/1999 | Kenner et al. | 1/1 |
| 6,002,394 | A | 12/1999 | Schein et al. | |
| 6,006,225 | A | 12/1999 | Bowman et al. | |
| 6,163,795 | A | 12/2000 | Kikinis | |
| 6,209,129 | B1 * | 3/2001 | Carr et al. | 725/42 |
| 6,230,324 | B1 * | 5/2001 | Tomita et al. | 725/51 |
| 6,268,849 | B1 | 7/2001 | Boyer et al. | |
| 6,369,840 | B1 | 4/2002 | Barnett et al. | |
| 6,434,621 | B1 * | 8/2002 | Pezzillo et al. | 709/231 |
| 6,434,747 | B1 * | 8/2002 | Khoo et al. | 725/46 |
| 6,670,971 | B1 | 12/2003 | Oral | |
| 6,732,372 | B2 * | 5/2004 | Tomita et al. | 725/47 |
| 6,742,184 | B1 | 5/2004 | Finseth et al. | |
| 6,993,783 | B2 * | 1/2006 | Kai | 725/53 |
| 2003/0066085 | A1 * | 4/2003 | Boyer et al. | 725/104 |
| 2007/0277201 | A1 * | 11/2007 | Wong et al. | 725/40 |

* cited by examiner

*Primary Examiner* — James R Sheleheda
(74) *Attorney, Agent, or Firm* — Arent Fox LLP

(57) ABSTRACT

A system for searching TV program data via the Internet, wherein TV program data is received from broadcasting stations via the Internet and recorded in a database. A program data search means enables the user to search for specific TV program data or search tabulation data for the TV program data provided by a search tabulation means.

13 Claims, 4 Drawing Sheets

FIG. 2

(1) Flowchart of process in the program data recording means 21

Broadcasting station terminals 1

A) Broadcast schedule recording means 21a

S10

Record broadcast schedule data file in timetable 11a

B) Subject matter recording means 21b

S11

Record program guide data file in subject matter table 11b (2) Flowchart of process in the user contract recording means 22

User terminals 2

A) User recording means 22a

S20

Record user registration data auto-numbered with a user code in the user table 12a Data management terminal 7

B) Contract time recording means 22b

S21

Input contract time and add to remaining contract time in the user table 12a. Update remaining contract time in the user table 12a. Record remaining contract time in the usage fees table 12b.

(3) Flowchart of process in the program data search means 23

(4) Financial tabulation recording means 24

SYSTEM FOR SEARCHING TV PROGRAM DATA VIA THE INTERNET

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a system for searching TV program data via the Internet, and particularly to a system that manages TV program data received from broadcasting stations and provides users with TV program data and tabulated data of searches performed by the user on the TV program data.

2. Description of the Related Art

Examples of media used conventionally to provide users with information on TV programs include advertisements on TV programs and TV guide magazines. Advertisements of TV programs include those that are broadcast during station breaks between programs and those broadcast during a program to advertise upcoming programs in the series. However, the time period in which programs are advertised is determined by the broadcasting stations and, due to the varied lifestyles of viewers and the limitations of broadcasting times, it is not possible to reach all viewers with this advertising method.

While TV guide magazines are not restricted by time, as are the TV program advertisements, they have less impact on the viewers than the TV program advertisements because the magazines cannot include video or sound.

Further, viewer percentages for TV programs are obtained for periods during and at the end of a broadcast. This data is published after the program has been aired. However, an index showing the interest of viewers for programs to be broadcast in the future is not available.

SUMMARY OF THE INVENTION

In view of the foregoing, it is an object of the present invention to provide a system for searching TV program data, which system manages TV program data received from broadcasting stations via the Internet and provides users with the TV program data and tabulated data on searches that viewers have performed on the TV program data.

These objects and others will be attained by a system for searching TV program data via the Internet for managing TV program data supplied by broadcasting stations via the Internet and providing TV program data and tabulated data on results of searching the TV program data to a user.

The system comprises broadcasting station terminals provided for broadcasting stations supplying the TV program data; user terminals for receiving the TV program data; and a data management apparatus connected to the broadcasting station terminals and user terminals via the Internet.

The data management apparatus comprises a communication connection controller connected to the Internet via a firewall; a database; a web server that receives via the Internet search requirements from the user terminals and transmits via the Internet results of searching the database; a database server for searching and updating the database; a data management terminal for managing the database; and a central processing controller.

The database comprises a program data database including a timetable for recording data of the broadcasting schedule for TV programs, and a subject matter table for storing program guide data; a user table for recording user registration data of users searching the TV program data; a usage fees table for recording usage data of the users; and a user database formed of a search tabulation table for recording tabulation data of searches performed by the user.

The central processing controller comprises program data recording means that includes broadcasting schedule recording means for receiving entry requirements from the broadcasting station terminals and recording broadcasting schedule data in the timetable and subject matter recording means for recording program guide data in the subject matter table; user contract recording means that includes user registration means for receiving requirements from user terminals and recording user registration data in the user table and contract time recording means for receiving requirements from the data management terminal and storing contract time data in the user table and the usage fees table; program data searching means for receiving requirements from the user terminals and searching for broadcasting schedule data and program guide data recorded in the program data database; and tabulation usage fees recording means that includes search tabulation recording means for recording the search tabulation data in a search tabulation table, the search tabulation data being the number of searches performed on TV program data recorded in the timetable by the program data searching means and tabulated according to broadcasting date, user attributes, program category, and program, and usage fees data recording means for recording usage fees data for searching TV program data in the usage fees table.

According to another aspect of the present invention, the program data searching means comprises month specific searching means for searching the timetable for broadcasting schedule data and program guide data according to a specified broadcast month; day specific searching means for searching the timetable for broadcasting schedule data and program guide data according to a specified broadcast day; program category specific searching means for searching the timetable for broadcasting schedule data and program guide data according to a specified program category; and station data access ratio searching means for calculating the access ratio of program data according to programs by user attributes, programs by program category, and program according to tabulated search data recorded in the search tabulation table by the search tabulation recording means and searching the search tabulation data in the reverse order of the program data access ratio.

According to another aspect of the present invention, the TV program data includes television program data of Internet TV broadcasting stations that broadcast via the Internet.

BRIEF DESCRIPTION OF THE DRAWINGS

In the drawings:

FIG. 2 is a flowchart showing the process flow in a central processing controller of the present invention;

DESCRIPTION OF THE PREFERRED EMBODIMENTS

Figure 1:
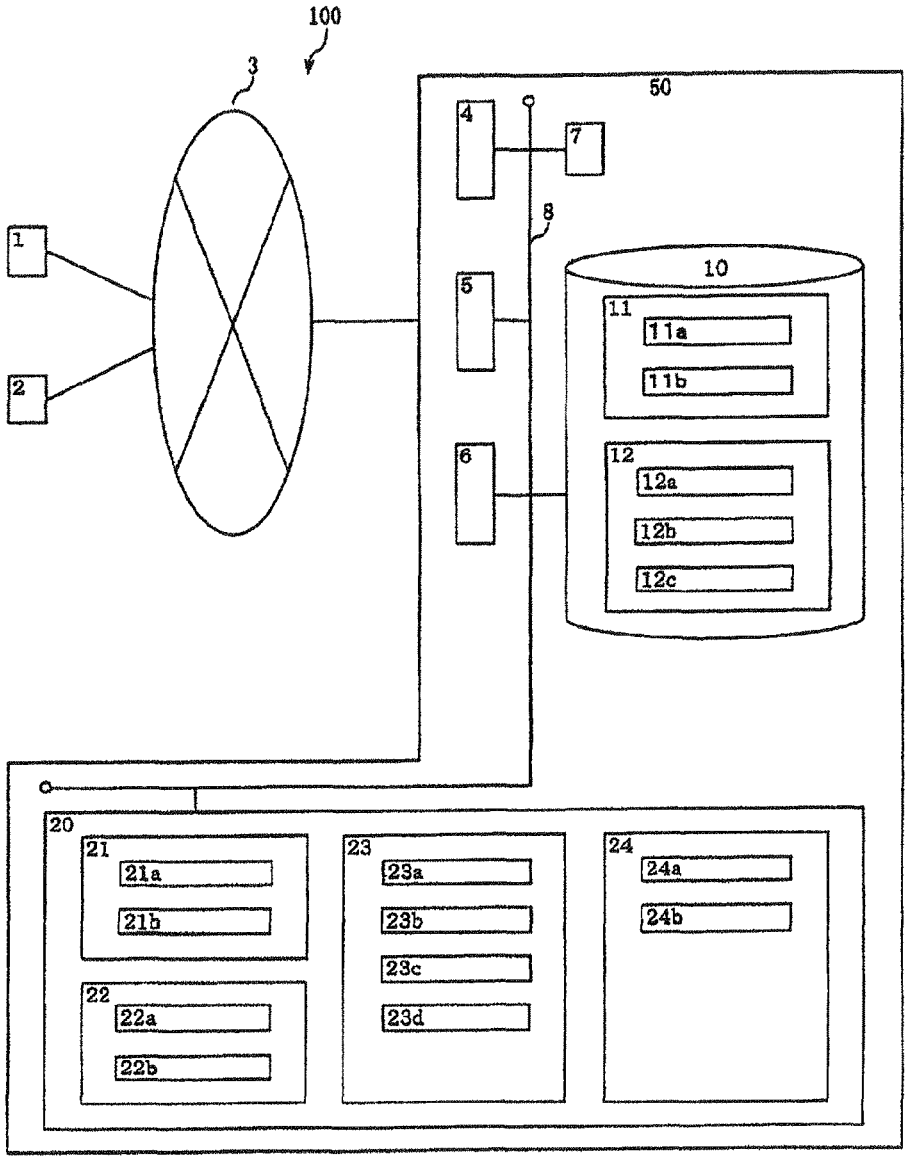
FIG. 1 is an explanatory diagram showing the construction of a system of the present invention for searching TV program data via the Internet.

A system for searching TV program data via the Internet according to preferred embodiments of the present invention will be described while referring to the accompanying drawings. FIG. 1 is an explanatory diagram showing the construction of a system 100 of the present invention for searching TV program data via the Internet.

As shown in FIG. 1, the system 100 includes broadcasting station terminals 1 provided for broadcasting stations supplying the TV program data; user terminals 2 for receiving the TV program data; and a data management apparatus 50 connected to the broadcasting station terminals 1 and user terminals 2 via the Internet.

The data management apparatus includes a communication connection controller 4 having a firewall for connecting the system 100 to the Internet; a database 10; a web server 5 that receives via the Internet search requirements from the user terminals 2 and transmits via the Internet results of searching the database 10; a database server 6 for searching and updating the database 10; a data management terminal 7 for managing the database 10; and a central processing controller 20. In addition a LAN 8 is provided to connect the communication connection controller 4, the web server 5, and the database 10 to each other.

The database includes a program data database 11 comprising a timetable 11a for recording data of the broadcasting schedule for TV programs and a subject matter table 11b for storing program guide data; a user database 12 formed of a user table 12a for recording user registration data of users searching the TV program data, a usage fees table 12b for recording usage data of the users; and a search tabulation table 12c for recording tabulation data of searches performed by the users.

The time table 11a records broadcast schedule data. Data stored in the timetable 11a includes year and month search keys comprising a broadcasting station code, broadcast year and month, broadcast starting time, broadcast day of the week, and broadcast day; broadcast year, month, and day search keys comprising a broadcasting station code, broadcast year, month, and day, broadcast day of the week, and broadcast starting time; program search keys comprising broadcast codes, program category codes, and program codes; and program titles, program times, and subject matter codes are stored in a data section.

The program category codes are set to such broad categories as sports, music, serial shows, movies, comedies, documentaries, specials, and new programs. Codes are further set for more specific categories on two levels under these broad categories.

The subject matter table 11b records program guide data. Data stored in the subject matter table 11b includes subject matter search keys comprising broadcasting station codes and subject matter codes; and a station guide employing audio and video stored in the data section.

The user database 12 is configured of a user table 12a, a usage fees table 12b, and a search tabulation table 12c.

The user table 12a records user registration data. The user table 12a stores user codes belonging to the search key section and user attribute data belonging to the data section, including the user name, address, telephone number, remaining time on contract, sex, age, and occupation.

The usage fees table 12b records usage data. The usage fees table 12b stores user codes belonging to the search key section and such data belonging to the data section as the process category, search start year, month, and day, search start time, search end year, month, and day, search end time, length of search time, and remaining time on contract. The process category is set to "contract" when entering a contract time and to "search" when searching for program data.

The search tabulation table 12c records search tabulation data. The search tabulation table 12c stores broadcast date data belonging to the search key section and comprising broadcast year, month, and day and broadcast day of the week; user attribute data comprising the user's sex, age, and occupation; search tabulation keys including program data comprising a broadcasting station code, program category code, and program code; and number of searches belonging to the data section.

Figure 3:
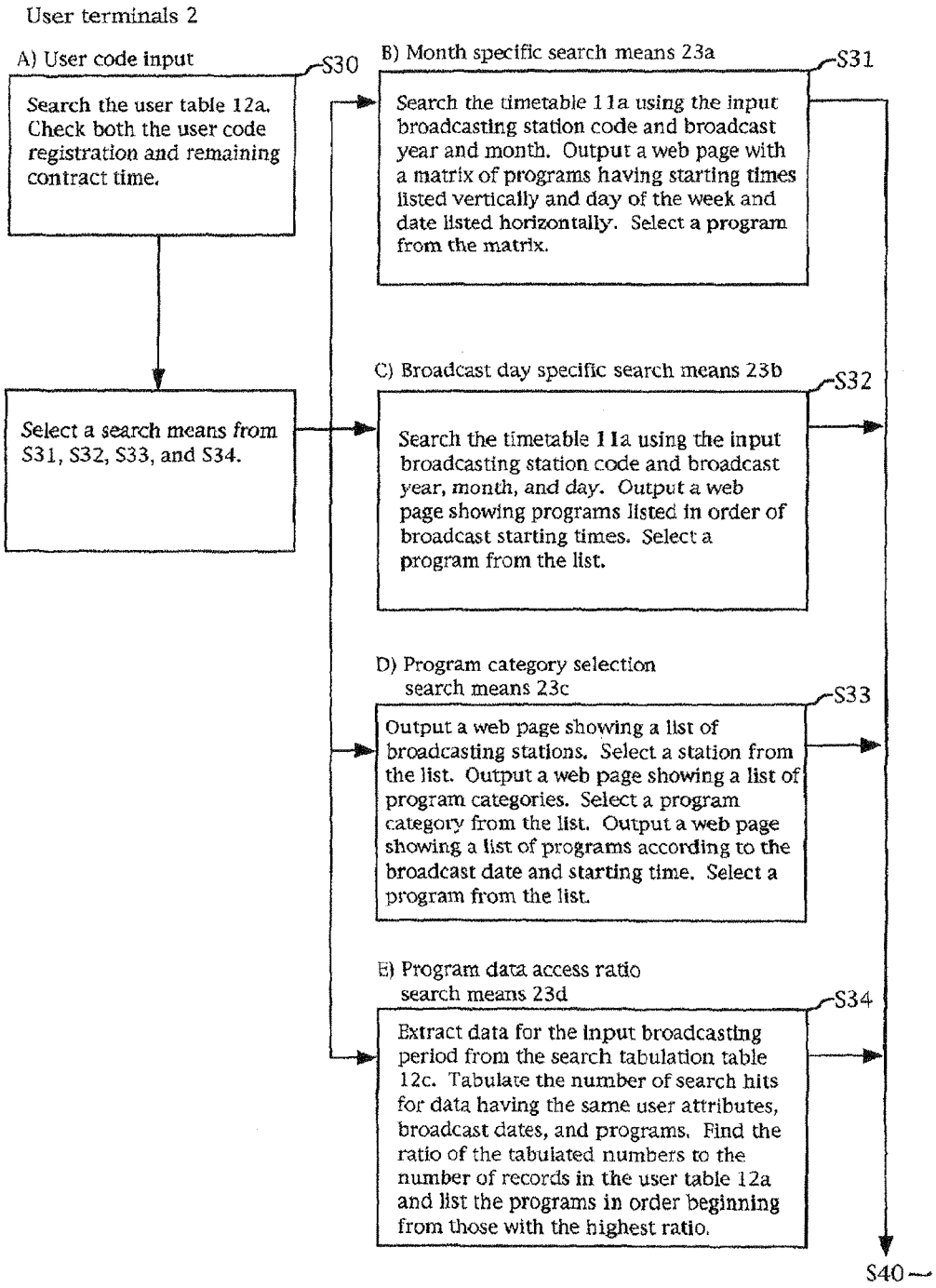
FIG. 3 is a flowchart showing the process flow in a central processing controller of the present invention.
Figure 4:
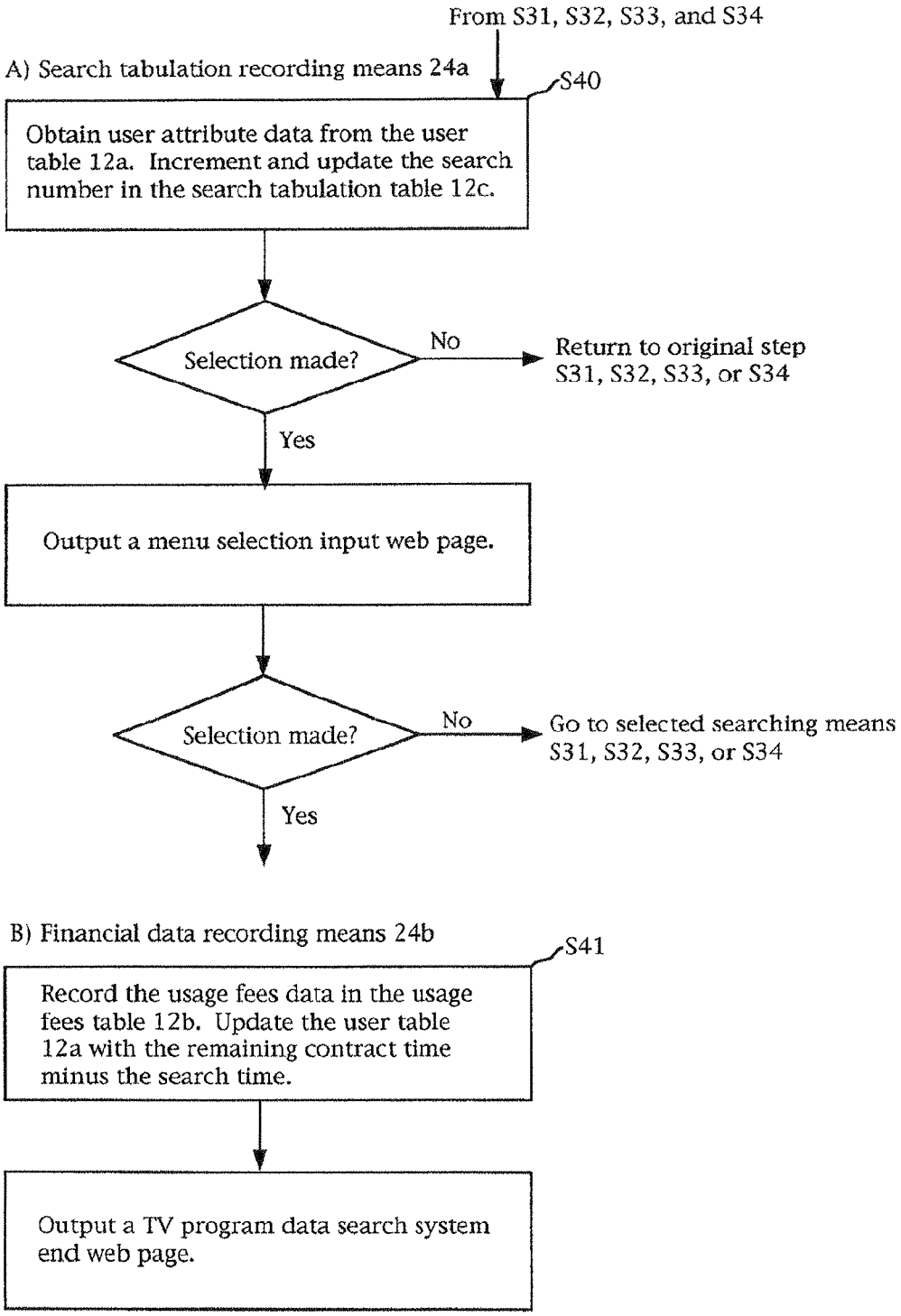
FIG. 4 is a flowchart showing the process flow in a central processing controller of the present invention.

In response to request signals received from the broadcasting station terminals 1, user terminals 2, and data management terminal 7 via the Internet 3. The central processing controller 20 searches and updates the database 10. The procedure for searching and updating the database 10 will be described next with reference to the diagrams. FIGS. 2, 3, and 4 show the flow of processes in the central processing controller 20 of the present invention. The process flow is configured of the following four procedures.

The central processing controller 20 includes program data recording means 21 that includes broadcasting schedule recording means 21a for receiving entry requirements from the broadcasting station terminals and recording broadcasting schedule data in the timetable, and subject matter recording means 21b for recording program guide data in the subject matter table.

The central processing controller 20 further includes user contract recording means 22 that includes user registration means 22a for receiving requirements from user terminals and recording user registration data in the user table and contract time recording means 22b for receiving requirements from the data management terminal and storing contract time data in the user table and the usage fees table.

The central processing controller 20 further includes a program data search means 23 comprising month specific searching means 23a for searching the timetable for broadcasting schedule data and program guide data according to a specified broadcast month; day specific searching means 23b for searching the timetable for broadcasting schedule data and program guide data according to a specified broadcast day; program category specific searching means 23c for searching the timetable for broadcasting schedule data and program guide data according to a specified program category; and station data access ratio searching means 23d for searching search tabulation data recorded in the search tabulation table.

The central processing controller 20 further includes tabulation usage fees recording means 24 comprising search tabulation recording means 24a for recording the tabulation data for searches on TV program data in the search tabulation table after the program data search means 23 is executed, and usage fees data recording means 24b for recording usage fees charged for searching TV program data in the usage fees table.

First, the terminal ID and password input from the broadcasting station terminals 1, user terminals 2, or data management terminal 7 are verified to determine user authorization. If the ID and password are authorized, then a web page corresponding to the selection input in the menu is transmitted. Next, the process of the program data recording means 21 will be described.

In the process of the broadcast schedule recording means 21a (S10), a web page for recording the broadcast schedule is transmitted to the broadcasting station terminal 1 in response to a signal requesting a to record a broadcast schedule. A broadcast data file is received from the broadcasting station terminal 1 and recorded in the timetable 11a. As described above, the file stores the year and month search keys comprising the broadcasting station code, broadcast year and month, broadcast starting time, broadcast day of the week, and broadcast day; broadcast year, month, and day search keys comprising a broadcasting station code, broadcast year, month, and day, broadcast day of the week, and broadcast starting time; program search keys comprising broadcast codes, program category codes, and program codes; and program titles, program times, and subject matter codes are stored in a data section. After recording the data, a web page indicating that the broadcast schedule recording process has completed is transmitted to the broadcasting station terminal 1.

When the user of the broadcasting station terminal 1 selects "end," a web page displaying a menu of selections is transmitted to the broadcasting station terminal 1.

In the process of the subject matter recording means 21b (S11), a web page for recording subject matter is transmitted to the broadcasting station terminal 1 in response to a signal requesting to record such data is received therefrom. A program guide data file is received and recorded in the subject matter table 11b. The file includes the subject matter search keys comprising broadcasting station codes and subject matter codes; and a station guide employing audio and video stored in the data section. After recording is completed, a web page indicating that the recording process has completed is transmitted to the broadcasting station terminal 1.

When the user of the broadcasting station terminal 1 selects "end," a web page displaying a menu of selections is transmitted to the broadcasting station terminal 1.

In the process of the user recording means 22a (S20), a user registration web page is transmitted to the user terminal 2 in response to a signal by the user requesting to register. The user enters such registration data as user name, address, telephone number, sex, age, and occupation. The registration data is received and an auto-numbered user code for the search key section is stored along with the registration data for the data section in the user table 12a. A web page showing an edited display of the user code and the user registration data and indicating the end of the user registration process is transmitted to the user terminal 2.

When the user of the broadcasting station terminal 1 selects "end," a web page displaying a menu of selections is transmitted to the broadcasting station terminal 1.

In the process of the contract time recording means 22b (S21), a web page for recording the contract date and inputting a user code is transmitted to the data management terminal 7 in response to a signal requesting to enter such data. After receiving input of the user code and contract year, month, and day from the data management terminal 7, the user table 12a is searched using the input user code as a search key. The user code and user registration data including the user name, address, telephone number, remaining time on contract, sex, age, and occupation stored in the user table 12a is edited and output on a web page for recording and inputting the contract time. This web page is transmitted to the data management terminal 7. After receiving a contract time input from the data management terminal 7, this input contract time is added to the remaining contract time in the user table 12a, and the user table 12a is updated. The user code, the process category set to "contract," the search start time set to the contract year, month, and day, and the added remaining contract time are recorded in the usage fees table 12b. A web page showing an edited display of the user code and the user registration data and indicating the end of the contract time registration process is transmitted to the user terminal 2.

When the user of the broadcasting station terminal 1 selects "end," a web page displaying a menu of selections is transmitted to the broadcasting station terminal 1.

In the user code input process (S30), a web page for inputting a user code is transmitted to the user terminal 2 in response to a signal from the user terminal 2 requesting to search program data. After receiving the user code input from the user terminal 2, the user table 12a is searched using this user code as a search key. Further checks are performed on the user code registration and remaining contract time. If the contract has not expired, then the user makes a selection from among the month specific search means 23a, broadcast day specific search means 23b, program category selection search means 23c, and program data access ratio search means 23d.

The time elapsed during searches is monitored by acquiring the system date and system time during the process performed by the program data search means 23. When the remaining time on the contract expires, a web page indicating that the contract has expired for using the TV program search system is transmitted to the user terminal 2 and the process of the program data search means 23 is interrupted.

In the process of the month specific search means 23a (S31), a web page for specifying a month of program data is transmitted to the user terminal 2 in response to a signal from the user terminal 2 requesting such a search. After receiving the year and month search start key input from the user terminal 2, including the broadcasting station code and broadcasting year and month, the timetable 11a is searched based on this data to acquire broadcast schedule data comprising the broadcast start time, day of the week, day, program code, program title, and program time. A web page for searching program data, specifying a month, or selecting a program is transmitted to the user terminal 2. The web page shows an edited display of the year and month search start key data as the header with the program code, program title, and program time listed according to broadcast start time, day of the week, and date. After receiving a selection of program search key data from the user terminal 2 comprising a broadcasting station code, program category code, and program code, the timetable 11a is searched to acquire subject matter search key data and the subject matter table 11b is searched to acquire a program guide. Next, a web page indicating completion of the program data search and selection outputting the audio and video of the program guide is transmitted to the user terminal 2, and the search tabulation record process in S40 is executed.

In the process of the broadcast day specific search means 23b (S32), a web page for performing a broadcast date specific program data search is transmitted to the user terminal 2 in response to a signal there from requesting such a search. After receiving input from the user terminal 2 that includes year, month, and day search start key data comprising a broadcasting station code and broadcast year, month, and day, the timetable 11a is searched to obtain broadcast schedule data comprising the broadcast day of the week, the broadcast start time, and the program title and time. A web page for searching program data, specifying the broadcast day, and selecting a program is output to the user terminal 2. The web page shows an edited display of program titles and times according to the broadcast start time with a header containing the date search start key data and broadcast day of the week. After receiving a selection of program search key data from the user terminal 2 comprising a broadcasting station code, program category code, and program code, the timetable 11a is searched to acquire subject matter search key data and the subject matter table 11b is searched to acquire a program guide. Next, a web page indicating completion of the program data search and selection outputting the audio and video of the program guide is transmitted to the user terminal 2, and the search tabulation record process in S40 is executed.

In the process of the program category selection search means 23c (S33), a web page for searching program data and selecting a program category is transmitted to the user terminal 2 in response to a signal requesting such a search. After receiving a selection from the user terminal 2 for program search start key data comprising a broadcasting station code, the timetable 11a is searched to obtain a program category code. A web page for searching program data and selecting a program category is sent to the user terminal 2. The web page displays an edited list of program category codes with the broadcasting station code as the header. After receiving a selection of program search key data from the user terminal 2 comprising a broadcasting station code, program category code, and program code, the timetable 11a is searched to acquire the program title and time and the broadcast day of the week and year, month, and day. Next, a web page for searching program data, selecting a program category, and selecting a program is transmitted to the user terminal 2. The web page displays an edited list of programs comprising program titles, broadcast days of the week and dates, and broadcast start times with a header containing the broadcasting station code and program category code. After receiving a selection from the user terminal 2 for the program search key data comprising the broadcasting station code, program category code, and program code, the timetable 11a is searched to obtain the subject matter search key data, and the subject matter table 11b is searched to obtain a program guide. Next, a web page indicating completion of the program data search and selection outputting the audio and video of the program guide is transmitted to the user terminal 2, and the search tabulation record process in S40 is executed.

In the program data access ratio search means 23d (S34), a web page for searching program data access ratios is transmitted to the user terminal 2 in response to a signal requesting such a search. After receiving input from the user terminal 2 comprising the broadcast period and user attribute data, search tabulation data between the start and end date input for the broadcast period is extracted from the search tabulation table 12c. The number of search hits for data having the same user attribute data, broadcast data, and TV program data is tabulated based on the input user attribute data. The program data access ratio (program data access ratio=search number+user table record number×100) is found for the search tabulation data. The data is sorted based on the reverse order of the access ratio found. Next, a program data access ratio search end web page is transmitted to the user terminal 2. The web page displays an edited list of program data access ratios with a header containing the broadcast period and user attributes. The search tabulation record process in S40 is executed.

The process of the search tabulation recording means 24a (S40) is performed after the process executed by the program data search means 23. Here, the user table 12a is searched using the user code input in S30 as the search key data, and the user attribute data, including the user's sex, age, and occupation, is extracted. The search tabulation table 12c is searched using search key data of the search tabulation key, including user attributes, broadcast day data comprising the broadcast date and day of the week acquired by the usage fees tabulation recording means 24, and program data comprising the broadcasting station code, program category code, and program code. The number of searches is incremented by 1 and the search tabulation table 12c is updated.

When the user of the broadcasting station terminal 1 selects "end," a web page displaying a menu of selections is transmitted to the broadcasting station terminal 1. When "end" is selected on the web page, the usage fees data recording process of S41 is performed.

The process in S41 is performed by the usage fees data recording means 24b following the process of the usage fees tabulation recording means 24. The user table 12a is searched using the user code input in S30 as the search key data. The remaining contract time in the user table 12a is updated after subtracting the search time of searches performed by the usage fees tabulation recording means 24 from the remaining contract time. The user code, process category set to "search," search start date and time and end date and time and search duration for searching with the usage fees tabulation recording means 24, and the calculated remaining contract time are recorded in the usage fees table 12b. A TV program data search system end web page is transmitted to the user terminal 2.

While the invention has been described in detail with reference to specific embodiments thereof, it would be apparent to those skilled in the art that many modifications and variations may be made therein without departing from the spirit of the invention, the scope of which is defined by the attached claims.

The system for searching TV program data via the Internet of the present invention can target users having a wide variety of lifestyles and enables such users to select and search TV program data of their interest via the Internet at a time suiting their lifestyles.

Further, the functions for searching TV program data of the present invention include searching TV programs not only in the range of one day or one week, but also in the range of one month. If the name of the program is not known, the user can specify the genre of the program to find that program's name and broadcast date and time.

Unlike conventional TV program data, the present invention enables users to search TV program data prior to the program's broadcast to find programs of a high interest for use as statistical data.

What is claimed is:

1. A system for searching TV program data via the Internet for managing TV program data supplied by broadcasting stations via the Internet and providing TV program data and tabulated data on results of searching the TV program data to a user, the system comprising:

broadcasting station terminals provided for broadcasting stations supplying the TV program data;

user terminals for receiving the TV program data; and a data management apparatus connected to the broadcasting station terminals and user terminals via the Internet;

the data management apparatus comprising:

a communication connection controller connected to the Internet via a firewall;

a database;

a web server that receives via the Internet search requirements from the user terminals and transmits via the Internet results of searching the database;

a database server for searching and updating the database;

a data management terminal for managing the database; and a central processing controller;

the database comprising:

a program data database including a timetable for recording data of the broadcasting schedule for TV programs, and a subject matter table for storing program guide data;

a user table for recording user registration data of users searching the TV program data;

a usage fees table for recording usage data of the users; and a user database formed of a search tabulation table for recording tabulation data of searches performed by the user;

the central processing controller comprising:

*a* program data [recording means] *recorder* that includes *a* broadcasting schedule [recording means] *recorder* for receiving entry requirements from the broadcasting station terminals and recording broadcasting schedule data in the timetable, and *a* subject matter [recording means] *recorder* for recording program guide data in the subject matter table;

*a* user contract [recording means] *recorder* that includes *a* user [registration means] *register* for receiving requirements from user terminals and recording user registration data in the user table and *a* contract time [recording means] *recorder* for receiving requirements from the data management terminal and storing contract time data in the user table and the usage fees table;

*a* program data [searching means] *searcher* for receiving requirements from the user terminals and searching for broadcasting schedule data and program guide data recorded in the program data database; and

*a* tabulation usage fees [recording means] *recorder* that includes *a* search tabulation [recording means] *recorder* for recording the search tabulation data in a search tabulation table, the search tabulation data being the number of searches performed on TV program data recorded in the timetable by the program data [searching means] *searcher* and tabulated according to broadcasting date, user attributes, program category, and program, and *a* usage fees data *recorder* recording means for recording usage fees data for searching TV program data in the usage fees table*;*

*wherein the program data searcher provides the user with data related to searches that other users have performed on the TV program data.*

2. [A] *The* system for searching TV program data via the Internet as recited in claim 1, wherein the program data [searching means] *searcher* comprises:

*a* month specific [searching means] *searcher* for searching the timetable for broadcasting schedule data and program guide data according to a specified broadcast month;

*a* day specific [searching means] *searcher* for searching the timetable for broadcasting schedule data and program guide data according to a specified broadcast day;

*a* program category specific [searching means] *searcher* for searching the timetable for broadcasting schedule data and program guide data according to a specified program category; and

*a* station data access ratio [searching means] *searcher* for calculating the access ratio of program data according to programs by user attributes, programs by program category, and program according to tabulated search data recorded in the search tabulation table by the search tabulation [recording means] *recorder* and searching the search tabulation data in the reverse order of the program data access ratio.

3. [A] *The* system for searching TV program data via the Internet as recited in claim 1, wherein the TV program data includes television program data of Internet TV broadcasting stations that broadcast via the Internet.

*4. The system of claim 1, wherein the program data searcher performs searching of at least one selected from a group consisting of TV program data by genre and TV program data to find programs of interest prior to broadcast of the TV program.*

*5. The system of claim 1, wherein the usage fees comprise user fees for the searches performed by the user.*

*6. A system for searching TV program data via the Internet for managing TV program data supplied by broadcasting stations via the Internet and providing TV program data and tabulated data based on the results by searching the TV program data by a user, the system comprising:*

*broadcasting station terminals provided for broadcasting stations supplying the TV program data;*

*user terminals for receiving the TV program data;*

*and a data management apparatus connected to the broadcasting station terminals and user terminals via the Internet;*

*the data management apparatus comprising:*

*a communication connection controller connected to the Internet via a firewall;*

*a database;*

*a web server that receives via the Internet search requirements from the user terminals and transmits via the Internet results of searching the database;*

*a database server for searching and updating the database;*

*a database management terminal for managing the database; and*

*a central processing controller;*

*the database comprising:*

*a program data database including a timetable for recording data of the broadcasting schedule for TV programs, a subject matter table for storing program guide data, and data including the number of prior searches having the same TV program data;*

*a user database including:*

*a user table for recording user registration data of users searching the TV program data, wherein the user registration data includes at least one of the user's sex, age or occupation;*

*the central processing controller comprising:*

*a program data recorder that includes a broadcasting schedule recorder for receiving entry requirements from the broadcasting station terminals and recording broadcasting schedule data in the timetable and a subject matter recorder for recording program guide data in the subject matter table;*

*a user register for receiving requirements from user terminals and recording said user registration data in the user table;*

*a program data searcher for receiving requirements from the user terminals and from the user register and searching for broadcasting schedule data, program guide data recorded in the program data database, and data including the number of prior searches having the same TV program data;*

*wherein the program data searcher provides the user with data related to searches that other users have performed on the TV program data.*

*7. The system for searching TV program data via the Internet as recited in claim 6, wherein the program data searcher comprises a month specific searcher for searching the timetable for broadcasting schedule data and program guide data according to a specified broadcast month, a day specific searcher for searching the timetable for broadcasting schedule data and program guide data according to a specified broadcast day, a program category specific searcher for searching the timetable for broadcasting schedule data and*

*program guide data according to a specified program category, and a station data access ratio searcher for calculating an access ratio of program data according to programs by user attributes, programs by program category, and programs according to tabulated search data recorded in a search tabulation table by a search tabulation recorder, and searching the search tabulation data in the reverse order of the program data access ratio.*

*8. The system for searching TV program data via the Internet as recited in claim 6, wherein the TV program data includes television program data of Internet TV broadcasting stations that broadcast via the Internet.*

*9. The system for searching TV program data via the Internet as recited in claim 6, wherein the database includes a usage fees table for recording usage data of the users; and*

*a search tabulation table for recording tabulation data of searches performed by the user.*

*10. The system for searching TV program data via the Internet as recited in claim 6, wherein the central processing controller comprises a user contract recorder that includes a contract time recorder for receiving requirements from the data management terminal and storing contract time data in the user table and the usage fees table, a tabulation usage fees recorder that includes a search tabulation recorder for recording the search tabulation data in a search tabulation table, the search tabulation data being the number of searches performed on TV program data recorded in the timetable by the program data recorder and tabulated according to broadcasting date, user attributes, program category, and program, and a usage fees data recorder for recording usage fees data for searching TV program data in the usage fees table.*

*11. The system for searching TV program data via the Internet as recited in claim 6, wherein the program guide data is the data consisting of video data identifying TV programs.*

*12. The system for searching TV program data via the Internet as recited in claim 6, wherein the program guide data is the data including the contents of the TV program.*

*13. The system of claim 6, wherein the program data searcher performs searching of at least one selected from a group consisting of TV program data by genre and TV program data to find programs of interest prior to broadcast of the TV program.*

* * * * *

UNITED STATES PATENT AND TRADEMARK OFFICE

CERTIFICATE OF CORRECTION

PATENT NO. : RE45,088 E
APPLICATION NO. : 12/781287
DATED : August 19, 2014
INVENTOR(S) : Kai et al.

It is certified that error appears in the above-identified patent and that said Letters Patent is hereby corrected as shown below:

IN THE CLAIMS:

Claim 1, Column 9, line 34, delete "recording means".

Signed and Sealed this
Twenty-sixth Day of May, 2015

Michelle K. Lee

Michelle K. Lee
*Director of the United States Patent and Trademark Office*